Nov. 11, 1958 R. F. POST 2,860,241
RATIO COMPUTER
Filed Oct. 29, 1954
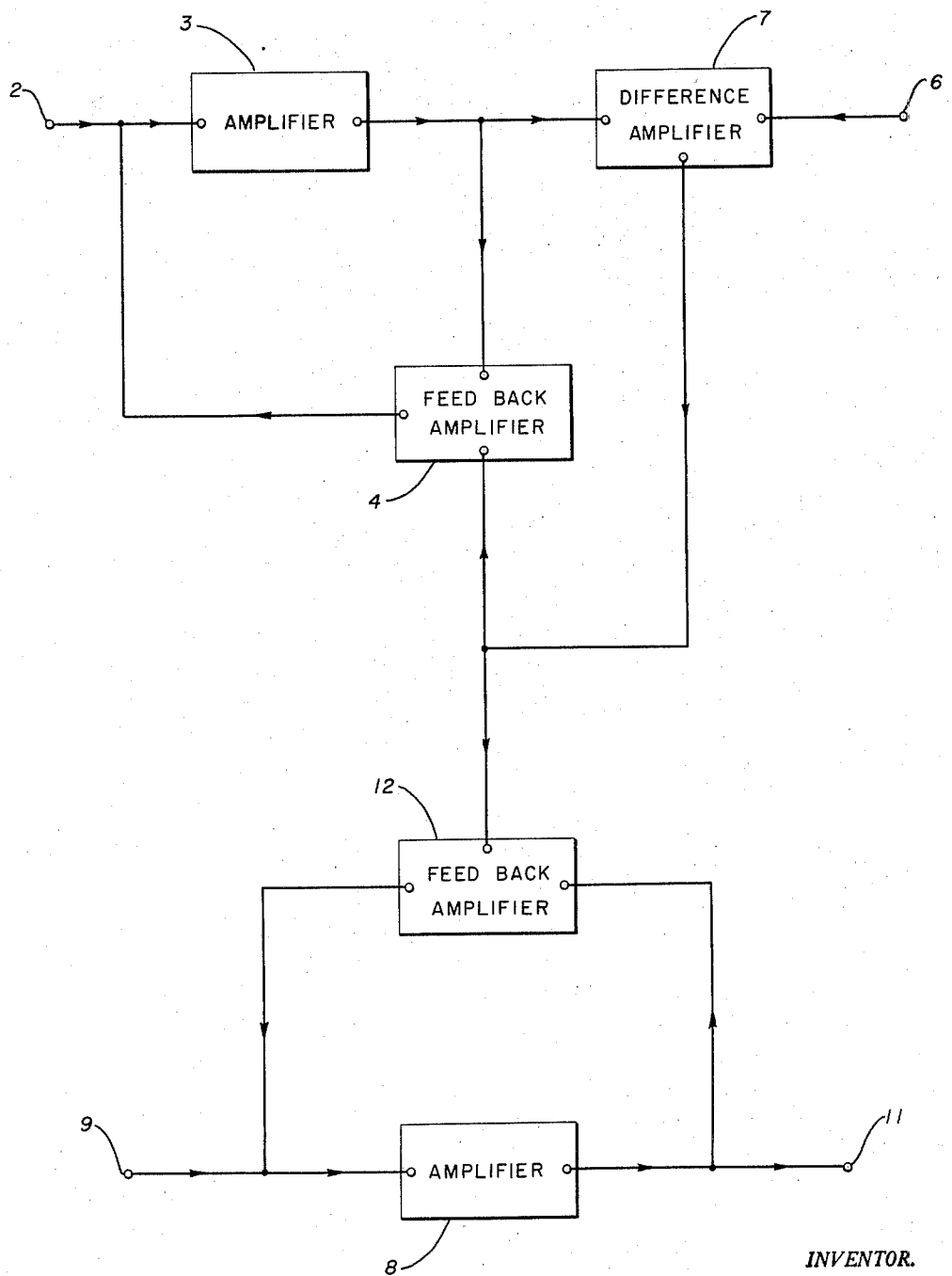
INVENTOR.
RICHARD F. POST
BY
ATTORNEY.

United States Patent Office 2,860,241
Patented Nov. 11, 1958

2,860,241
RATIO COMPUTER

Richard F. Post, Walnut Creek, Calif., assignor to the United States of America as represented by the United States Atomic Energy Commission Application October 29, 1954, Serial No. 465,758

2 Claims. (Cl. 250—27)

The present invention relates to an electronic circuit adapted to produce signals having voltages proportional to the product or quotient of the voltages of a pair of input signals.

The circuit of the present invention generally comprises two channels adapted to receive separate input signals and each having amplifiers with like fixed amplification factors and like negative feedback amplifiers. One of the channels is also adapted to receive a constant signal for comparison purposes, whereby a difference signal is produced to control the amplification factors of said variable feedback amplifiers. The output of the other channel is thereby proportional to the product or quotient of input signals depending upon the relation of input to fixed signals in the first of said channels.

By providing two substantially identical channels whereby like operations are performed upon both input signals the difficulties of nonlinearity and drift of the component circuits are overcome. This is particularly important in electronic computers where a high degree of accuracy is required, for exact linearity of amplifiers is quite difficult to obtain and because slight fluctuations in supply voltages are almost unavoidable. The present invention is adapted for use as a computer itself or as a component of a computer having other functions but requiring the basic multiplication and division operations.

It is an object of the present invention to provide an improved computer circuit.

It is another object of the present invention to provide a computer circuit having two like channels for separate input signals and compensating for nonlinearity of circuit components.

It is a further object of the present invention to provide a computer having a first channel producing a difference signal from a first input signal and a standard signal and a second channel for second input signals and controlled by said difference signal, whereby the second channel output is proportional to the product or quotient of said input signals.

Numerous other possible objects and advantages of the invention will become apparent to those skilled in the art from the following disclosure of a preferred embodiment of the invention taken together with the accompanying drawing wherein the sole figure is a block diagram of the computer circuit.

Considering now the circuit of the invention as illustrated in the drawing, there is provided a first input terminal 2 adapted to receive an input signal having an instantaneous voltage $E_1$. This terminal 2 is connected to the input of an amplifier 3 which has a constant or fixed amplification factor A. The output of amplifier 3 is partially fed back to the input thereof through a feedback amplifier 4 having a controlled variable amplification factor B, and amplifier 4 is thus connected from the output of amplifier 3 to the input thereof and provides a phase inversion so that negative or degenerative feedback is accomplished.

A second terminal 6 is provided in this portion of the computer circuit and is connected to one input terminal of a difference amplifier 7 which has the other input terminal thereof connected to the output of amplifier 3. This difference amplifier 7 operates to amplify the voltage difference between the output of amplifier 3 and a reference voltage $E_R$ at terminal 6, and to this end may include a simple comparison network together with a conventional amplifier connected thereto for amplifying the difference of the compared signals. The amplified difference voltage from amplifier 7 is applied to the control means of the feedback amplifier 4 to control the feedback amplification. The above-described portion of the circuit may be considered as one channel of the computer circuit, wherein there is produced a difference voltage which is employed to control a second channel of the computer.

A second portion or channel of the computer circuit includes an amplifier 8 having a constant or fixed amplification factor $A^1$. An input terminal 9 adapted to receive a second input signal $E_2$ having an instantaneous voltage is connected to the input of the amplifier 8 and an output terminal 11 is connected to the output of this amplifier 8. Degenerative feedback is provided in this channel through a feedback amplifier 12 having a variable controllable amplification factor $B^1$. The feedback amplifier 12 has an input terminal connected to the output of the amplifier 8 and an output terminal connected to the input of amplifier 8 so that a portion of the output of amplifier 8 is fed back to the input thereof out of phase to effectively reduce the input signal. The feedback amplifier 12 includes control means for controlling the amplification factor $B^1$ thereof in response to a signal thereto, and this control signal is obtained from the output of the difference amplifier 7 which is connected to control means of the feedback amplifier 12.

The amplifiers 3 and 8 of the two channels are identical and the amplification factors A and $A^1$ respectively are the same. Likewise, the two feedback amplifiers 4 and 12 of the two channels are preferably identical and, as they each receive the same control signal from the difference amplifier 7, the feedback amplifier amplification factors B and $B^1$ are the same. It will thus be seen that in the first channel of the computer circuit there is produced a control signal that is a function of the difference between a first input signal and a constant reference signal and that this control signal is emloyed to control feedback in the second channel, whereby the output thereof comprises a function of the first and second input signals and of the reference signal.

Considering the relationship of instantaneous voltages in the computer circuit, the output voltage of the amplifier 3 is given by the relation:

$$E_3 = A(E_1 - E_3 B)$$

wherein:

$E_1$ = input voltage at terminal 2
$E_3$ = voltage at the output of amplifier 3
$A$ = amplification factor of amplifier 3
$B$ = amplification factor of feedback amplifier 4 and this relationship may be rewritten as $$B = \frac{E_1}{E_3} - \frac{1}{A}$$

The control signal from the difference amplifier is applied to the feedback amplifier 4 to vary the feedback so as to reduce the difference between the reference voltage $E_R$ and the output voltage $E_3$ of the amplifier 3. Thus, the first or upper channel of the circuit operates to make $E_3$ equal to $E_R$ with the difference signal being proportional to the change in $E_3$ to make same equal to $E_R$. Consequently, with the computer circuit operating, $E_3=E_R$ and the above relationship may be written:

$$B=\frac{E_1}{E_R}-\frac{1}{A}$$

A similar expression for the relationship of input and output voltages in the second channel may be written:

$$E_0=(E_2-B^1E_0)A^1$$

wherein:

$E_2$=input voltage at terminal 9
$E_0$=output voltage at terminal 11
$A^1$=amplification factor of amplifier 8
$B^1$=amplification factor of feedback amplifier 12

As noted above, amplifiers 3 and 8 in the first and second channels respectively are alike and have the same amplification so the $A=A^1$ and as the two feedback amplifiers 4 and 12 are alike and receive the same control signal, $B=B^1$. Substituting in the above equation then gives:

$$E_0=(E_2-BE_0)A$$

and solving this for $E_0$ gives:

$$E_0=\frac{E_2A}{1+AB}$$

Substituting in this latter equation the above-derived relation for $B$ and reducing the same to simplified form provides the voltage relationship:

$$E_0=\frac{E_2E_R}{E_1}$$

It will be seen from the foregoing that the output $E_0$ is equal to the ratio of input signals at the input terminals multiplied by a constant ($E_R$) so that the output voltage is thus proportional to the quotient of input voltages. There may be readily produced at the output terminal a voltage proportional to the product of input voltages merely by interchanging the input and reference voltage terminals 2 and 6. With the input voltage $E_1$ applied at terminal 6 and the reference voltage at terminal 2 the voltages $E_1$ and $E_R$ are interchanged in the above relationships so the $$E_0=\frac{E_1E_2}{E_R}$$

and the output voltage is proportional to the product of input voltages.

By the provision of like amplifiers in each channel of the circuit the internal errors of one do not affect the other and the resultant signal is not influenced thereby. It is preferable to provide a common power supply for all of the amplifiers so that voltage fluctuations originating thereat affect each amplifier equally and no error signal results.

What is claimed is:

1. A computer circuit comprising first and second input terminals adapted to receive input signals, a pair of like amplifiers connected one to each of said input terminals, variable negative feedback means for each of said amplifiers, a source of constant potential, and comparison means connecting said source of constant potential and the output of one of said amplifiers for producing a control voltage proportional to the voltage difference thereof, said comparison means being further connected to both of said feedback means for impressing the control voltage thereon to control the percentage feedback whereby the voltage at the output of the amplifier not connected to said comparison means is proportional to the ratio of input voltages.

2. A computer circuit comprising three input terminals and an output terminal, first and second like amplifiers having the same constant amplification connected with the input of the first amplifier to the first of said input terminals and the second amplifier between the second of said input terminals and said output terminal, third and fourth like amplifiers having variable amplification factors and connected across said first and second amplifiers respectively for degenerative feedback, and a comparison circuit connected between said third input terminal and the output of said first amplifier producing a voltage proportional to the voltage difference therebetween and impressing same upon said third and fourth amplifiers for controlling the amplification thereof whereby the voltage at said output terminal is proportional to the product of voltages at said first and third input terminals divided by the voltage at said second terminal.

References Cited in the file of this patent
UNITED STATES PATENTS

| 2,200,613 | Zuccarello | May 14, 1940 |
| 2,208,665 | Crabtree | July 23, 1940 |
| 2,340,443 | Schenau | Feb. 1, 1944 |
| 2,392,586 | Goddard | Jan. 8, 1946 |
| 2,419,852 | Owen | Apr. 29, 1947 |

FOREIGN PATENTS

| 844,925 | Germany | July 28, 1952 |

OTHER REFERENCES

"Electronic Instruments," Book, Louis Ridenour, editor, McGraw-Hill, 1948, page 50.